US009473356B2

(12) United States Patent
Goetsch

(10) Patent No.: US 9,473,356 B2
(45) Date of Patent: Oct. 18, 2016

(54) AUTOMATIC CONFIGURATION OF APPLICATIONS BASED ON HOST METADATA USING APPLICATION-SPECIFIC TEMPLATES

(71) Applicant: Oracle International Corporation, Redwood Shores, CA (US)

(72) Inventor: Kelly Goetsch, Wausau, WI (US)

(73) Assignee: Oracle International Corporation, Redwood Shores, CA (US)

( * ) Notice: Subject to any disclaimer, the term of this patent is extended or adjusted under 35 U.S.C. 154(b) by 311 days.

(21) Appl. No.: 14/041,957

(22) Filed: Sep. 30, 2013

(65) Prior Publication Data

US 2015/0095473 A1    Apr. 2, 2015

(51) Int. Cl.
G06F 7/00 (2006.01)
G06F 17/00 (2006.01)
H04L 12/24 (2006.01)
G06F 9/445 (2006.01)

(52) U.S. Cl.
CPC ....... *H04L 41/0886* (2013.01); *G06F 9/44505* (2013.01)

(58) Field of Classification Search
CPC ................. G06F 17/30212; G06F 17/30578; G06F 17/30067; G06F 17/30094; G06F 17/30569
USPC .......................................................... 707/626
See application file for complete search history.

(56) References Cited

U.S. PATENT DOCUMENTS

| 8,302,077 | B2* | 10/2012 | Manczak | G06F 8/71 717/107 |
|---|---|---|---|---|
| 2004/0148370 | A1* | 7/2004 | Sadiq | G06Q 30/016 709/223 |
| 2005/0021688 | A1* | 1/2005 | Felts | H04L 41/0803 709/220 |
| 2007/0143379 | A1* | 6/2007 | i Dalfo | G06F 8/61 |
| 2010/0088317 | A1* | 4/2010 | Bone | G06F 17/30144 707/737 |
| 2011/0320574 | A1* | 12/2011 | Felts | G06F 9/44505 709/220 |
| 2012/0089666 | A1* | 4/2012 | Goswami | G06Q 10/103 709/203 |
| 2013/0232498 | A1* | 9/2013 | Mangtani | G06F 9/5072 718/104 |

* cited by examiner

Primary Examiner — Robert Beausoliel, Jr.
Assistant Examiner — Michael Pham
(74) Attorney, Agent, or Firm — Kilpatrick Townsend & Stockton LLP

(57) ABSTRACT

In accordance with an embodiment, a metadata generator tool can automate the configuration of applications in a domain. The metadata generator tool can automatically capture metadata for the deployment and update one or more application specific property files using application specific templates. In some embodiments, the data generation tool can use introspection to identify metadata for a deployment. Depending on the deployment environment different introspection methods may be used (e.g., in a WebLogic domain one set of introspection methods may be used while in a WebSphere or Tomcat domain different methods may be used). Once the metadata is captured, property files associated with the applications can be updated using application-specific templates. Each template can define how the metadata is referenced in the property files, allowing the tool to automatically configure the property files by substituting the captured metadata where appropriate.

23 Claims, 5 Drawing Sheets

AUTOMATIC CONFIGURATION OF APPLICATIONS BASED ON HOST METADATA USING APPLICATION-SPECIFIC TEMPLATES

BACKGROUND

When an application is deployed, a user, such as an administrator or other information technology personnel, configures the application for the environment in which it is deployed. For example, when an application is started, a new managed server can be started on a host. To operate correctly, the new managed server needs to be configured to run on the host, based on information about the host. This information can include host metadata, such as port numbers, host IP, file system paths, etc. and is specific to that deployment. Traditionally, this information was manually obtained and then application configuration files were manually updated. In cloud-based environments where servers are being rapidly started and shut down, manual configuration can become a tedious and expensive task.

SUMMARY

In accordance with an embodiment, a metadata generator tool can automate the configuration of applications in a domain. The metadata generator tool can automatically capture metadata for the deployment and update one or more application-specific property files using application-specific templates. In some embodiments, the data generation tool can use introspection to identify metadata for a deployment. Depending on the deployment environment different introspection methods may be used (e.g., in a WebLogic domain one set of introspection methods may be used while in a WebSphere or Tomcat domain different methods may be used). Once the metadata is captured, property files associated with the applications can be updated using application-specific templates. Each template can define how the metadata is referenced in the property files, allowing the tool to automatically configure the property files by substituting the captured metadata where appropriate.

Automatic configuration of applications at deployment saves time and expense associated with manual configuration. Particularly in environments that operate many servers across hosts in multiple data centers, where this data cannot be known ahead of time.

In accordance with an embodiment, a method of automatically configuring applications based on a deployment environment can comprise receiving a request to start a managed server associated with an application in a domain; and identifying a template associated with the managed server. The template can define how configuration data is referenced in one or more property files associated with the managed server. The method can further comprise determining metadata, which includes a plurality of domain-specific parameters, for the domain, and automatically substituting the configuration data in the one or more property files with the metadata based on the template to create one or more configured property files. The managed server can be started using the one or more configured property files.

In some embodiments, identifying a template associated with the managed server can include determining a name of the managed server; and matching the name of the managed server to the template. In some embodiments, determining metadata for the domain include calling one or more introspection methods on the domain. The metadata can include one or more of port numbers, host name, a number of hosts, and a location to store log messages/data/metadata.

In some embodiments, the request to start a managed server includes a location of a plurality of templates. In some embodiments, automatically substituting the configuration data in the one or more property files with the metadata based on the template can include identifying one or more tags in the one or more property files, where each tag corresponds to a different domain-specific parameter; and replacing each tag with its corresponding domain-specific parameter. In some embodiments, at least one domain-specific parameter can be incremented contextually, based on how many hosts are in the domain.

In accordance with an embodiment, a system for automatically configuring applications based on a deployment environment can comprise a computer, including a computer readable storage medium and processor. The system can also include a plurality of templates that each define how configuration data is referenced by an application in one or more property files; and a metadata generator tool, executing on the computer. The metadata generator tool can be configured to receive a request to start a managed server associated with an application in a domain, identify a template from the plurality of templates associated with the managed server, determine metadata for the domain, wherein the metadata includes a plurality of domain-specific parameters, automatically substitute the configuration data in the one or more property files with the metadata based on the template to create one or more configured property files, and start the managed server using the one or more configured property files.

DETAILED DESCRIPTION OF THE INVENTION

Figure 1:
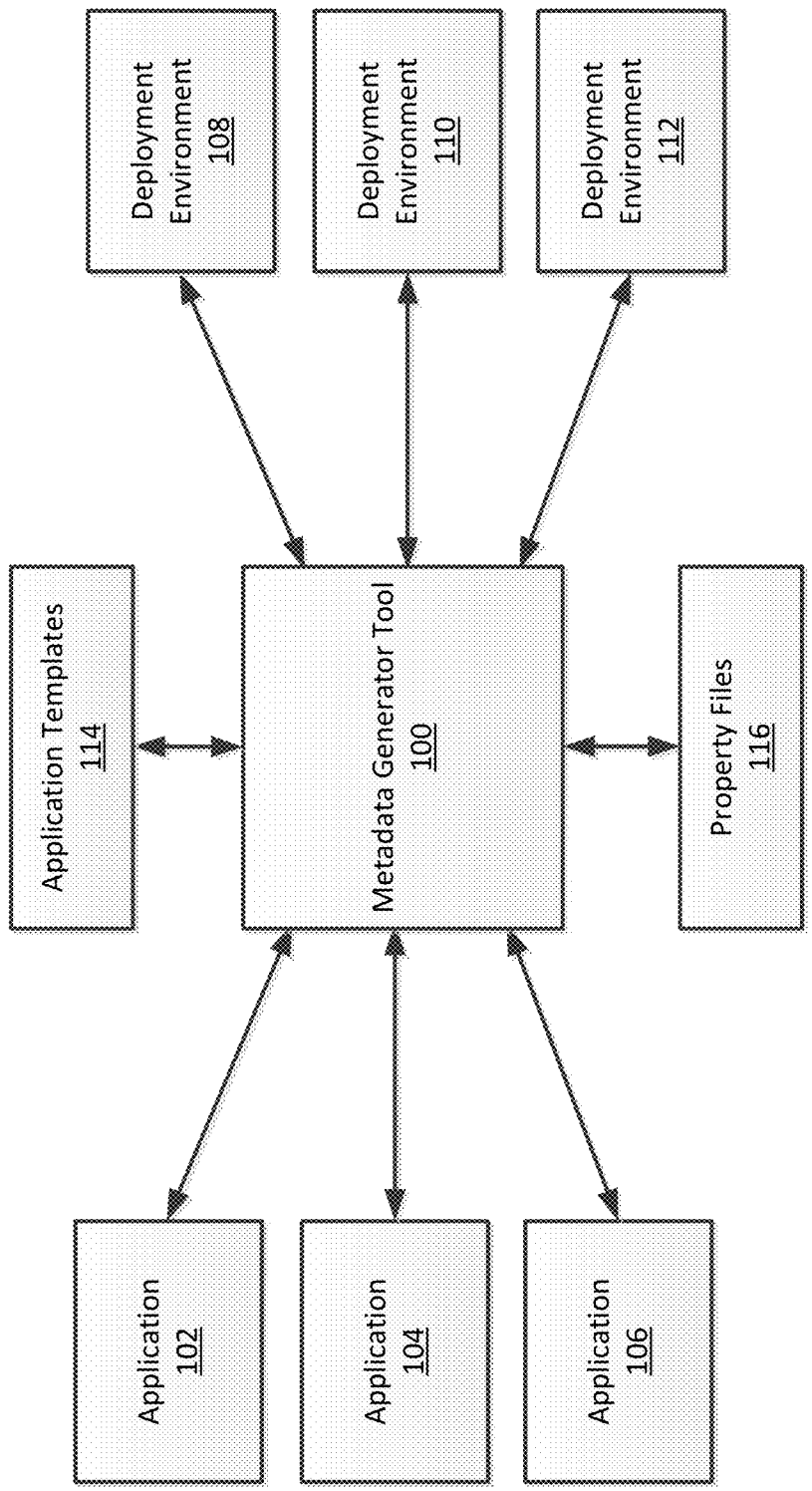
FIG. 1 shows a metadata generator tool, in accordance with an embodiment of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Applications can be deployed to application servers as archive files (e.g., JAR, WAR, EAR, and other archives). When an application is configured for a particular deployment, information about the deployment environment is collected and stored. The deployment information is typically stored outside of the application's archive, in an accessible portion of the deployment environment's file system. This deployment information can include metadata which includes domain-specific parameters, such as available ports for JMS messaging or an HTTP port. Typically any deployment information that is not included in the archive, is written out to the file system and stored in a property file. The property file provides the application with access to the deployment information in a known location and in a known format so that it can be utilized by the application as needed, without requiring the application to identify or request the deployment information each time it is needed. Additionally, log messages and other details may also be written to the file system. The traditional manual approach to configuration does not scale well in environments that frequently start-up and shutdown applications and servers. For example, in a cloud environment it is likely unknown what ports will be available, how many hosts will be executing on a hardware server, etc. which previously would require significant manual input.

In accordance with an embodiment, an application template can be created for each application that is supported by the metadata generator tool. The application template can be an abstraction of the application's property file. For example, the application template can have the same format as the application's property file, with metadata replace by configuration placeholders. When an application is deployed, the metadata generator tool can identify metadata for the deployment environment, and automatically configure the application's property file based on application's associated templates by replacing the configuration placeholders with metadata. In some embodiments, the metadata generator tool can identify a template for the application based on application data. The application data can include a name of a server instance created during application startup. In accordance with an embodiment, when an application is started a new managed server can be instantiated. The name of the new managed server instance can follow a naming convention shared with the template. The metadata generator tool can determine the name of the new managed server instance and compare the name of the new managed sever instance to the names of application templates to identify a corresponding application template. For example, when a new managed server instance called "app1_production_01" is created, the metadata generator tool can identify a corresponding template called "app1_production". Once the metadata is captured, property files associated with the applications can be created using application-specific templates and configured using the metadata. Each template can define how the metadata is referenced in the property files, allowing the tool to automatically configure the property files by substituting the captured metadata where appropriate.

FIG. 1 shows a metadata generator tool, in accordance with an embodiment of the present invention. As shown in FIG. 1, a metadata generator tool 100 can be used to automatically configure a plurality of applications 102-106 for a plurality of deployment environments 108-112. As described above, metadata generator tool 100 can automate the configuration of applications, such as applications 102-106, that are being deployed to different deployment environments, such as 108-112. For a particular deployment, the metadata generator tool 100 can determine a type of deployment environment and then capture metadata for that deployment environment. In some embodiments, the metadata generator tool 100 can capture the metadata for the deployment environment through introspection. Depending on the type of deployment environment, different introspection methods may be used. For example, in a WebLogic domain one set of introspection methods may be used while in a WebSphere or Tomcat domain different methods may be used. The metadata generator tool can be configured to support a plurality of different deployment environments by adding introspection methods corresponding to each supported deployment environment.

During deployment of an application, the metadata generator tool 100 can identify one or more application templates for the application. For example, application deployment can include starting one or more managed servers associated with the application in the deployment environment. Each managed server can be associated with a different template. In some embodiments, the metadata generator tool 100 can identify an application template corresponding to a particular managed server based on a naming convention of the managed server. Once the corresponding template has been identified, the metadata generator tool 100 can create a property file for the new managed server based on the template. Each template can define how metadata is referenced in an application's property file using one or more tags that each correspond to different metadata that can be captured by the metadata generator tool. To configure the property file, the metadata generator tool can substitute the corresponding metadata for each tag in the property file.

In some embodiments, the substitution can be a text substitution in which each tag is a predefined text string (e.g., "[HTTP_PORT]" or "[HOST_IP]"). The metadata generator tool can identify a predefined text string in the property file, determine the metadata that corresponds to that predefined text string and substitute the metadata for the predefined string. For example, a template may include a line that defines an RMI port as "rmiPort=886[X]". The string "[X]" can be predefined as the last digit of the HTTP port. When the property file is created it includes the RMI definition from the template. After the metadata generator tool has captured metadata for the deployment, including the HTTP port number, it can identify "[X]" in the property file and replace that string with the last digit of the HTTP port number. Accordingly, if the HTTP port is determined to be 7001, after the property file has been automatically configured by the metadata generator tool, the RMI definition can be "rmiPort=8861". This way, the property file can be configured automatically without manual input from a system administrator or other user.

Figure 2:
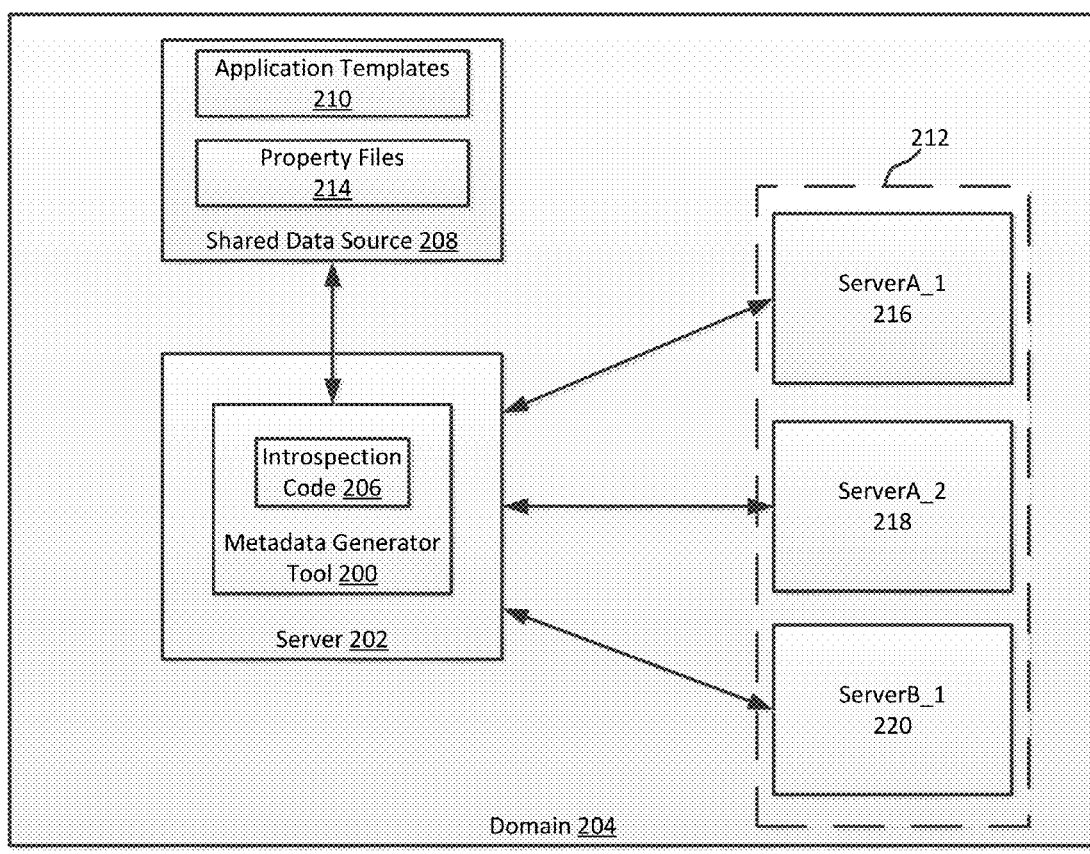
FIG. 2 shows a simplified diagram of using the metadata generator tool to deploy an application in a domain, in accordance with an embodiment of the present invention.

FIG. 2 shows a simplified diagram of using the metadata generator tool to deploy an application in a domain, in accordance with an embodiment of the present invention. As shown in FIG. 2, a metadata generator tool 200 can execute on a server 202, such as an administration server, in a domain 204. The domain can be a logical group of servers and server resources including an administration server that administers the domain and one or more managed servers and/or clusters of servers. The metadata generator tool 200 can include domain-specific introspection code 206 that can be used by the metadata generator tool to determine metadata for the domain. In some embodiments, the metadata generator tool 200 can include a plurality of introspection code modules, each for a different type of domain. When the metadata generator tool is deployed to the domain, it can determine the type of domain, and make the corresponding introspection code module for the type of domain a default introspection code. A shared data source 208 can include a plurality of application templates 210. When an application is started, one or more managed server instances 212 associated with that application can be created. Each managed server can have a property file 214 that includes metadata for the deployment. In some embodiments, the property files can be stored on the shared data source 208. In some embodiments, the property files can be stored in any local or remote file system that is accessible to the managed servers.

As described above, previously each time a new managed server was started an administrator or other user would have to manually configure the new managed server's property file with metadata for the deployment. In embodiments of the present invention, when a new managed server is started, the metadata generator tool 200 can identify an application template 210 corresponding to the new managed server, create a property file for the new managed server, and automatically configure the property file based on the domain's metadata. In some embodiments, the metadata generator tool 200 can identify a new managed server's corresponding template based on the new managed server's name. For example, as shown in FIG. 2, three new managed servers have been started: ServerA_1 216, ServerA_2 218, and ServerB_1 220. The metadata generator tool 200 can identify a template named ServerA as the template corresponding to both ServerA_1 216 and ServerA_2 218. Similarly, the metadata generator tool can identify a template named ServerB corresponding to ServerB_1.

Using the templates identified for the managed servers, the metadata generator tool 200 can create property files for each managed server and then configure the property files by performing text substitution of tags for metadata, as described above. In some embodiments, the metadata generator tool is context aware and can configure the property files based on the context. For example, based on the domain metadata, ServerA_1, ServerA_2, and ServerB_1 can be assigned HTTP ports of 7001, 7002, and 7003, respsectively. If a fourth server is started, the metadata generator tool can automatically set the fourth server's HTTP port to 7004.

Figure 3:
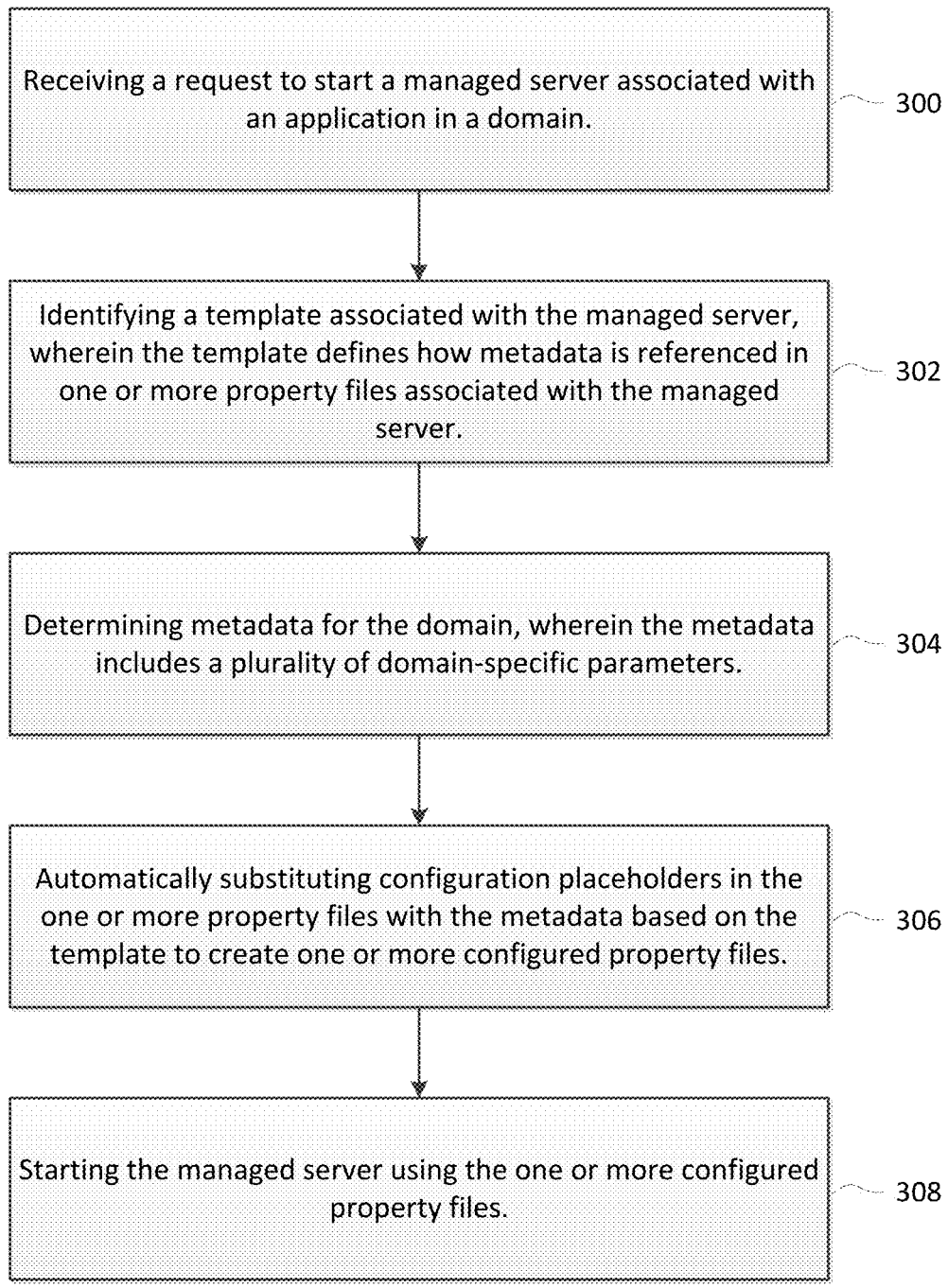
FIG. 3 shows a method of deploying an application using a metadata generator tool, in accordance with an embodiment of the present invention.

FIG. 3 shows a method of deploying an application using a metadata generator tool, in accordance with an embodiment of the present invention. At step 300, a request is received to start a managed server associated with an application in a domain. At step 302, a template associated with the managed server is identified. In some embodiments, the template defines how metadata is referenced in one or more property files associated with the managed server. At step 304, metadata for the domain is determined. In some embodiments, the metadata for the domain can be determined by calling one or more domain-specific introspection methods. As described above, the metadata can include a plurality of domain-specific parameters such as one or more of port numbers, host name, a number of hosts, and a location to store log messages. At step 306, configuration placeholders in the one or more property files are automatically substituted with the metadata based on the template to create one or more configured property files. In some embodiments, the configuration placeholders can be tags in the one or more property files. Each tag can corresponds to a different domain-specific parameter. The data configuration tool can identify each tag and replace each tag with its corresponding domain-specific parameter. At step, 308, the managed server is started using the one or more configured property files. In some embodiments, a request to start the managed server can include a location of a plurality of templates. As described above, a template associated with the managed server can be identified by determining a name of the managed server and matching the name of the managed server to the template.

Figure 4:
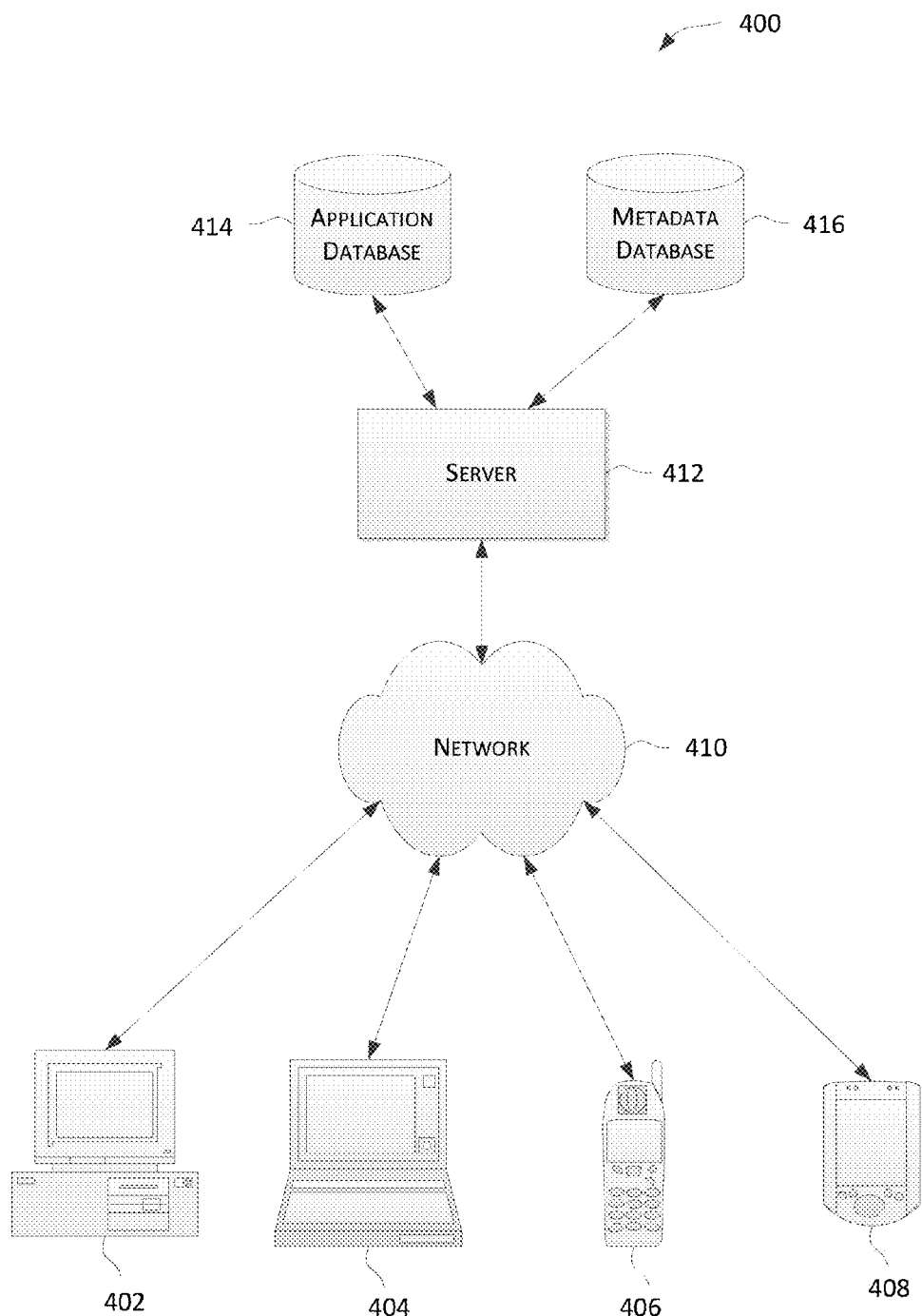
FIG. 4 is a simplified block diagram illustrating components of a system environment that may be used in accordance with some embodiments of the present invention.

FIG. 4 is a simplified block diagram illustrating components of a system environment 400 that may be used in accordance with some embodiments of the present invention. As shown, system environment 400 includes one or more client computing devices 402, 404, 406, 408, which are configured to operate a client application such as a web browser, proprietary client (e.g., Oracle Forms), or the like. In various embodiments, client computing devices 402, 404, 406, and 408 may interact with a server 412.

Client computing devices 402, 404, 406, 408 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 402, 404, 406, and 408 may be any other electronic device, such as a thin-client computer, Internet-enabled gaming system, and/or personal messaging device, capable of communicating over a network (e.g., network 410 described below). Although system environment 400 is shown with four client computing devices, any number of client computing devices may be supported. Other devices such as devices with sensors, etc. may interact with server 412. Authorization requests may be received from one or more client devices.

System environment 400 may include a network 410. Network 410 may be any type of network familiar to those skilled in the art that can support data communications using any of a variety of commercially-available protocols, including without limitation TCP/IP, SNA, IPX, AppleTalk, and the like. Merely by way of example, network 410 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 400 also includes one or more server computers 412 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 412 may be adapted to run one or more services or software applications described in the foregoing disclosure.

Server 412 may run an operating system including any of those discussed above, as well as any commercially available server operating system. Server 412 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 400 may also include one or more databases 414, 416. Databases 414, 416 may reside in a variety of locations. By way of example, one or more of databases 414, 416 may reside on a storage medium local to (and/or resident in) server 412. Alternatively, databases 414, 416 may be remote from server 412, and in communication with server 412 via a network-based or dedicated connection. In one set of embodiments, databases 414, 416 may reside in a storage-area network (SAN) familiar to those skilled in the art. Similarly, any necessary files for performing the functions attributed to server 412 may be stored locally on server 412 and/or remotely, as appropriate. In one set of embodiments, databases 414, 416 may include relational databases, such as Oracle 10g, 11g, Release 12, etc., which are adapted to store, update, and retrieve data in response to SQL-formatted and other commands. In one embodiment, policies configured to controlling a set of resources may be stored by one of the databases.

Figure 5:
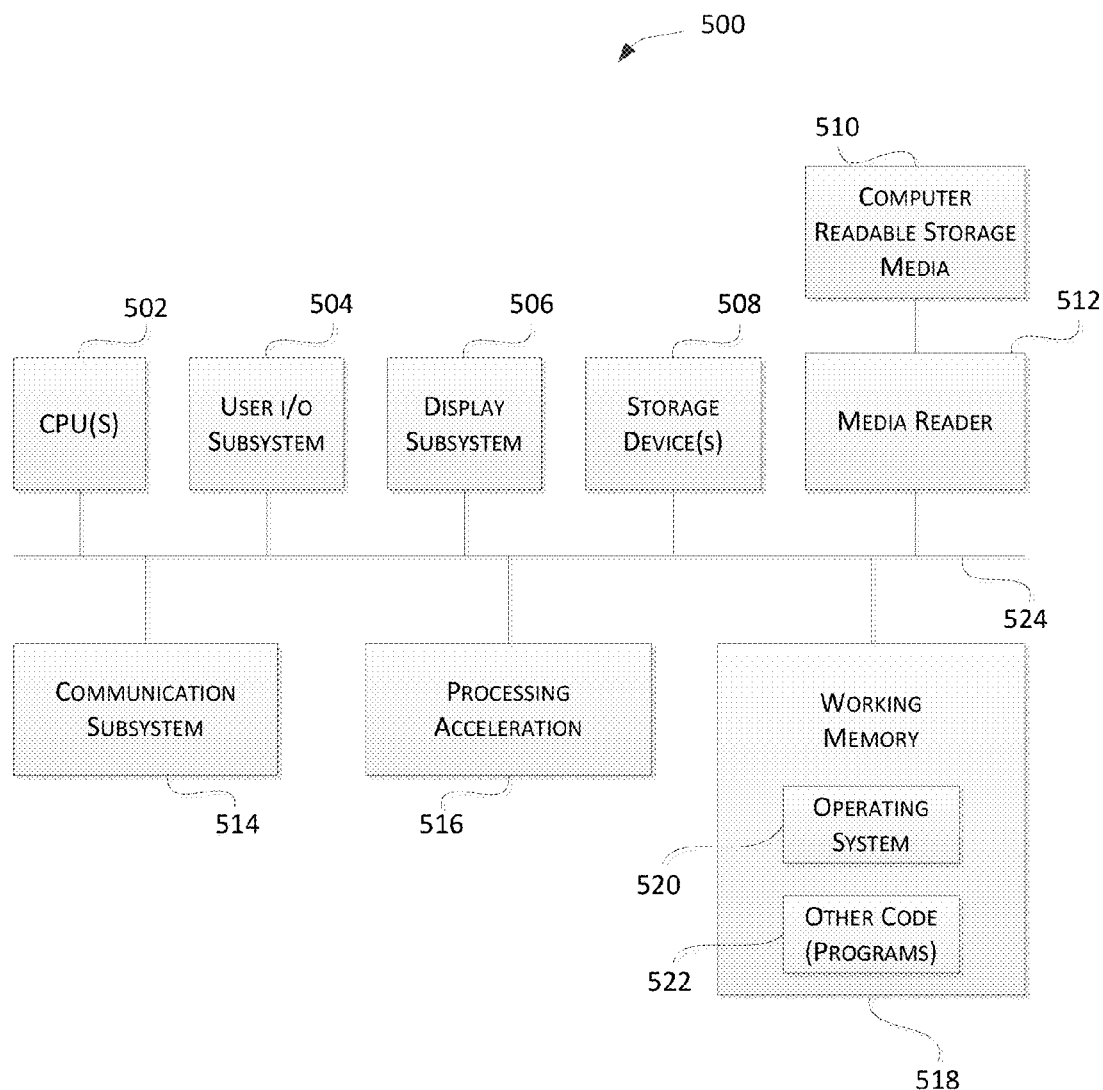
FIG. 5 is a simplified block diagram of a computing system that may be used in accordance with embodiments of the present invention.

FIG. 5 is a simplified block diagram of a computing system 500 that may be used in accordance with embodiments of the present invention. For example, the system depicted in FIG. 2 may be implemented using a system such as system 500. Computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The CPUs may include single or multicore CPUs. Computer system 500 may also include one or more storage devices 508. By way of example, the storage device(s) 508 may include devices such as disk drives, optical storage devices, and solid-state storage devices such as a random access memory (RAM) and/or a read-only memory (ROM), which can be programmable, flash-updateable and/or the like.

Computer system 500 may additionally include a computer-readable storage media reader 512, a communications subsystem 514 (e.g., a modem, a network card (wireless or wired), an infra-red communication device, etc.), and working memory 518, which may include RAM and ROM devices as described above. In some embodiments, computer system 500 may also include a processing acceleration unit 516, which can include a digital signal processor (DSP), a special-purpose processor, and/or the like.

Computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. Communications system 514 may permit data to be exchanged with network 1810 and/or any other computer described above with respect to system environment 1800.

Computer system 500 may also comprise software elements, shown as being currently located within working memory 518, including an operating system 520 and/or other code 522, such as an application program (which may be a client application, Web browser, mid-tier application, RDBMS, etc.). In an exemplary embodiment, working memory 518 may include executable code and associated data structures such as memory structures used for processing authorization requests described above. It should be appreciated that alternative embodiments of computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, CD-ROM, digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method of automatically configuring applications based on a deployment environment, comprising:
    receiving a request to start an application in a domain, in response to the request to start the application, instantiating a managed server and determining an identifier of the managed server, wherein the identifier is a name of the managed server;
    identifying a template from a plurality of templates in the domain, based on the identifier of the managed server, wherein the template defines how configuration data is referenced in one or more property files associated with the managed server;
    determining metadata for the domain, wherein the metadata includes a plurality of domain-specific parameters;
    automatically substituting the configuration data in the one or more property files with the metadata based on the template to create one or more configured property files; and
    starting the managed server using the one or more configured property files.

2. The method of claim 1, wherein identifying the template comprises:
    determining the name of the managed server; and
    matching the name of the managed server to the template.

3. The method of claim 1 wherein determining metadata for the domain include calling one or more introspection methods on the domain.

4. The method of claim 3 wherein the metadata includes one or more of port numbers, host name, a number of hosts, and a location to store log messages.

5. The method of claim 1 wherein the request to start an application includes a location of a plurality of templates.

6. The method of claim 1 wherein automatically substituting the configuration data in the one or more property files with the metadata based on the template includes:
    identifying one or more tags in the one or more property files, wherein each tag corresponds to a different domain-specific parameter; and
    replacing each tag with its corresponding domain-specific parameter.

7. The method of claim 6 wherein at least one domain-specific parameter is incremented contextually, based on how many hosts are in the domain.

8. A system for automatically configuring applications based on a deployment environment comprising:
    a computer, including a computer readable storage medium and processor;
    a plurality of templates, wherein each template of the plurality of templates defines how configuration data is referenced by an application in one or more property files;
    a metadata generator tool, executing on the computer, wherein the metadata generator tool is configured to
        receive a request to start an application in a domain, in response to the request to start the application, instantiate a managed server and determine an identifier of the managed server, wherein the identifier is a name of the managed server;
        identify a template from the plurality of templates based on the identifier of the managed server,
        determine metadata for the domain, wherein the metadata includes a plurality of domain-specific parameters,
        automatically substitute the configuration data in the one or more property files with the metadata based on the template to create one or more configured property files, and
        start the managed server using the one or more configured property files.

9. The system of claim 8 wherein identifying the template comprises:
    determining the name of the managed server; and
    matching the name of the managed server to the template.

10. The system of claim 8 wherein determining metadata for the domain include calling one or more introspection methods on the domain.

11. The system of claim 10 wherein the metadata includes one or more of port numbers, host name, a number of hosts, and a location to store log messages.

12. The system of claim 8 wherein the request to start an application a managed server includes a location of a plurality of templates.

13. The system of claim 8 wherein automatically substituting the configuration data in the one or more property files with the metadata based on the template includes:
    identifying one or more tags in the one or more property files, wherein each tag corresponds to a different domain-specific parameter; and
    replacing each tag with its corresponding domain-specific parameter.

14. The system of claim 13 wherein at least one domain-specific parameter is incremented contextually, based on how many hosts are in the domain.

15. A non-transitory computer readable storage medium including instructions stored thereon which, when executed by a processor, cause the processor to perform the steps of:
    receiving a request to start an application in a domain, in response to the request to start the application, instantiating a managed server and determining an identifier of the managed server, wherein the identifier is a name of the managed server;

identifying a template from a plurality of templates in the domain, based on the identifier of the managed server, wherein the template defines how configuration data is referenced in one or more property files associated with the managed server;

determining metadata for the domain, wherein the metadata includes a plurality of domain-specific parameters;

automatically substituting the configuration data in the one or more property files with the metadata based on the template to create one or more configured property files; and starting the managed server using the one or more configured property files.

16. The non-transitory computer readable storage medium of claim 15 wherein identifying the template comprises:
determining the name of the managed server; and
matching the name of the managed server to the template.

17. The non-transitory computer readable storage medium of claim 15 wherein determining metadata for the domain include calling one or more introspection methods on the domain and wherein the metadata includes one or more of port numbers, host name, a number of hosts, and a location to store log messages.

18. The non-transitory computer readable storage medium of claim 15 wherein the request to start an application includes a location of a plurality of templates.

19. The non-transitory computer readable storage medium of claim 15 wherein automatically substituting the configuration data in the one or more property files with the metadata based on the template includes:
identifying one or more tags in the one or more property files, wherein each tag corresponds to a different domain-specific parameter; and
replacing each tag with its corresponding domain-specific parameter.

20. The non-transitory computer readable storage medium of claim 19 wherein at least one domain-specific parameter is incremented contextually, based on how many hosts are in the domain.

21. The method according to claim 1, wherein a metadata generator tool automatically substitutes the configuration data in the one or more property files with the metadata.

22. The method according to claim 1, wherein the configuration data is substituted with the metadata according to a placeholder in the template for the metadata.

23. The method according to claim 1, wherein the identifier corresponds to a naming convention of the managed server.

* * * * *